(No Model.)
A. GILBERT & Z. T. BUSH.
VEHICLE SPRING.
No. 390,659. Patented Oct. 9, 1888.
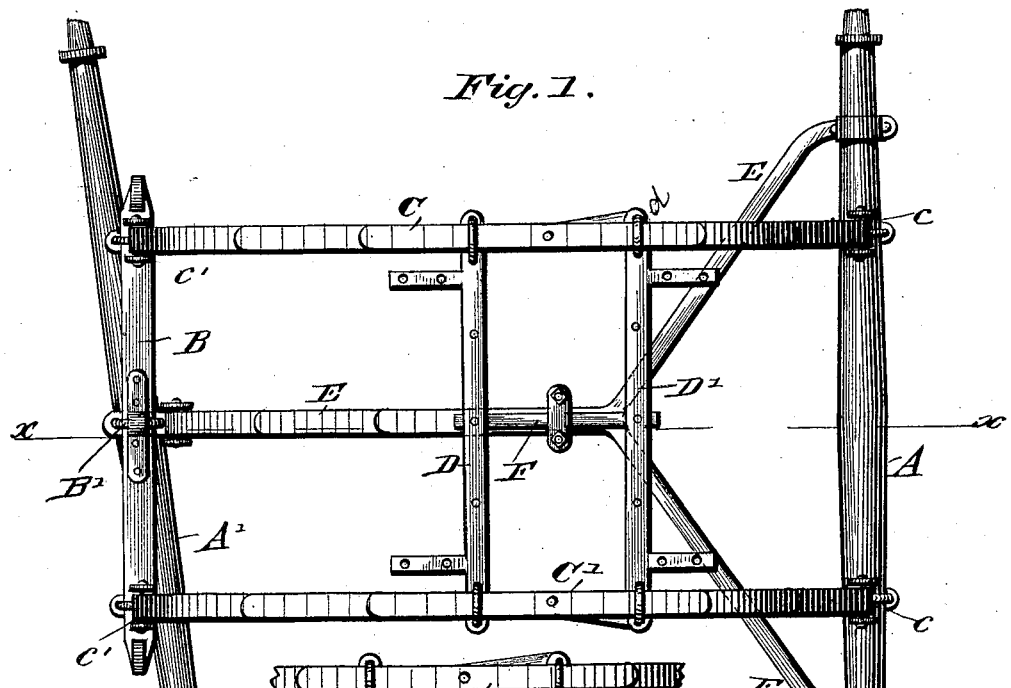
Fig. 1.
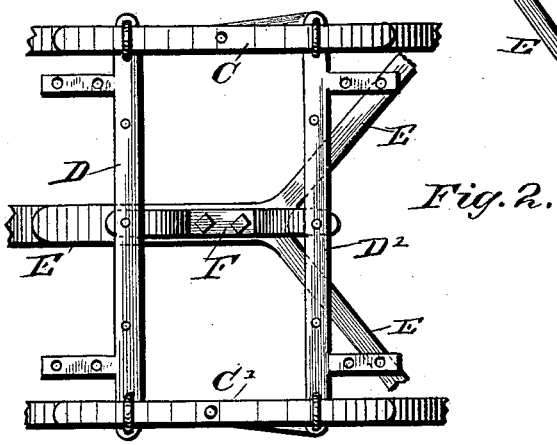
Fig. 2.
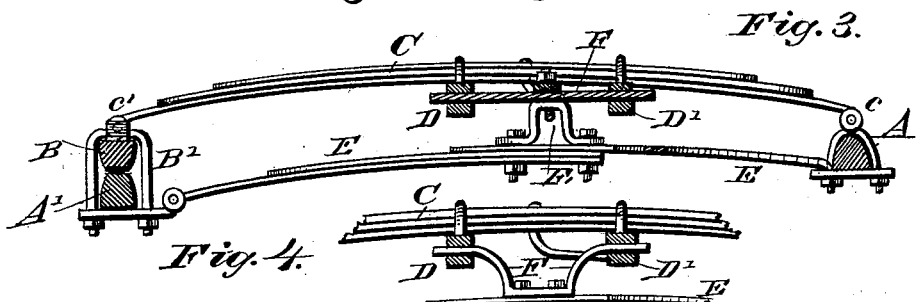
Fig. 3.
Fig. 4.
WITNESSES
Phil. C. Masi.
Ben Fugitt.
INVENTORS
Alonzo Gilbert
Z. T. Bush
by Anderson & Smith
their Attorneys

UNITED STATES PATENT OFFICE.

ALONZO GILBERT AND ZACHRIAH T. BUSH, OF STANTON, MICHIGAN.

VEHICLE-SPRING.

SPECIFICATION forming part of Letters Patent No. 390,659, dated October 9, 1888.

Application filed December 5, 1885. Serial No. 184,827. (No model.)

*To all whom it may concern:*

Be it known that we, ALONZO GILBERT and ZACHRIAH T. BUSH, citizens of the United States, residents at Stanton, in the county of Montcalm and State of Michigan, have invented certain new and useful Improvements in Vehicle-Springs; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a top view of a pair of axles, showing our improvements applied. Fig. 2 is a plan view with the axles removed and parts broken away. Fig. 3 is a vertical longitudinal section taken on line $x$ $x$, Fig. 1. Fig. 4 is a detail elevation.

This invention relates to improvements in side spring vehicles; and it consists in combining with longitudinal side springs a torsional spring-bar, which is secured to the reach and acts as hereinafter described to equalize the motion of the vehicle-body, prevent one side thereof from sagging, and to prevent the axles from being displaced by rolling in the bearings.

Referring to the accompanying drawings by letter, A designates the rear axle of the vehicle, and A' the front axle.

B is a head-block or spring-bar, having its center pivoted within the clevis B', and swinging frontward and rearward upon the middle of the front axle.

C C' are parallel side springs, convex on the upper surfaces, having their rear ends pivoted in the clips or shackles $c$, secured to the rear axle, and their front ends pivoted to the clips or shackles $c'$, similarly secured to the spring-bar B near its ends, as shown.

D D' are front and rear transverse bars upon which the vehicle-body rests and is secured, each bar having extensions, as shown, to more firmly support the same. The said bars have their ends firmly secured to the springs C C' by strong clips $d$.

E is a Y-shaped elastic spring-reach, having its convexity upward and its front end pivoted to the clevis B', the rear ends of the reach being secured to the under side of the rear axle just inside of the wheels either by clips, shackles, or other suitable manner. (The shape or form of the reach can be varied.)

F is a longitudinal torsional spring-bar, having its ends firmly secured to the centers of the bars D D' and its center rigidly secured to the brace-standard or lever F', the feet of which are bolted to the reach.

If desired, the brace-standard or lever F' may be omitted and the spring-bar bent rectangularly downward and bolted to the reach, as shown in Fig. 2. Both constructions perform the necessary functions equally well.

The described construction produces an elastic equalizer, preventing the sagging of one side of corner of the vehicle-body when the same is loaded more heavily than the other side, for when the body tends thus to sag the bars D D' tend to turn laterally, or upon the longitudinal axis running through their centers; but the lever or brace-standard F' is rigidly secured to the reach and the center of the torsional spring-bar F, which is rigidly secured at its ends to the bars D D', and supports the latter and prevents them and the connected parts from turning laterally through or by means of the torsional strain on the spring-bar F. The same connections of spring-bar F operate to prevent the vehicle-body from sagging, rocking, or swinging on rough or uneven ground. (The torsional spring-bar F, instead of being connected at its ends to the transverse bars D D', may be connected to the under side of the vehicle body, which will secure the same results.)

The invention also prevents the axles from rolling and being displaced by end-thrust, for when the wheels strike any obstruction suddenly and throw the body forward so as to cause the axles to roll in their bearings, the strain is taken by the reach having its front end secured to the axle by the clevis, and the spring-bar F, which is secured to the reach and body, and which tends to bring the latter to its proper position, while the reach prevents the axles from rolling.

We are aware of Reissue Patent No. 8,461, in which parallel side springs running from the front to the rear axle, a spring-reach, a cross-strap, and a body-loop having its ends secured directly to the body are employed, and therefore do not claim such construction, as it is impossible in such construction to get a torsional strain on the body-loop. The construction mentioned would, through the employment of the cross brace or strap, cause the springs and reach to move together in a vertical plane and the loop to act simply as a rigid brace, while in our construction the equalizing principle is obtained entirely from a torsional or twisting strain on the spring.

Having described this invention, what we claim, and desire to secure by Letters Patent, is—

1. In a side-spring vehicle, the combination, with the parallel side springs, of transverse body-bars secured to the said side springs at opposite ends, and the torsional bar connected with the reach and its opposite ends secured to the said transverse bars, substantially as specified.

2. In a side-spring vehicle, the combination, with the parallel side springs, of the transverse body-bars secured at opposite ends to the said spring, the spring-reach, and the torsional bar secured therewith and having its opposite ends secured to the said transverse bars midway between the said side springs and on a direct parallel line with them, so as to be in the longitudinal axis on which the springs turn in sagging at either side, substantially as specified.

3. The combination of the front and rear axles, the head-block pivoted by its center to the center of the front axle, the lateral parallel springs having their rear ends secured to the rear axle and the front ends secured to the pivoted head-block, the parallel bars to support the body, having their ends secured to the lateral springs, the spring-bar having its ends secured to the center of said bars, and the reach having the said spring-bar connected with it by rigid supports, substantially as specified.

4. The combination of the front and rear axles, A A′, the pivoted head-block or spring-supporting bar B, the clevis B′, the springs C C′, the transverse supporting-bars D D′, the reach E, having its front end pivoted to the clevis secured to the front axle, the spring-bar F, uniting the supporting-bars, and the brace-standard F′, connecting the spring-bar and reach, substantially as specified.

In testimony whereof we affix our signatures in presence of two witnesses.

ALONZO GILBERT.
ZACHRIAH T. BUSH.

Witnesses:
  PAYNE KNIGHT,
  F. A. LYON.